United States Patent Office 3,093,617
Patented June 11, 1963

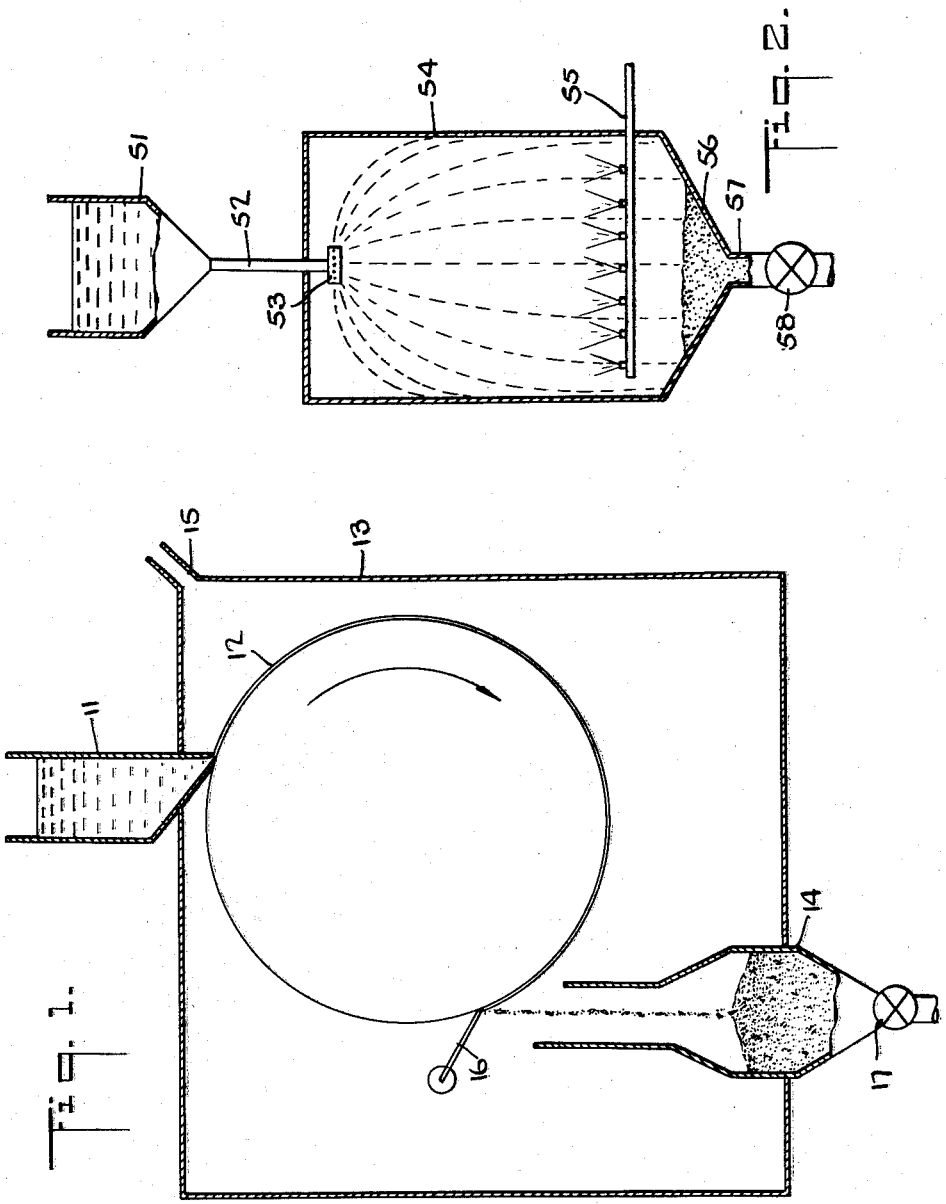

3,093,617
CONTINUOUS BULK POLYMERIZATION
PROCESS
Donald E. Hudgin, Summit, and Frank M. Berardinelli, South Orange, N.J., assignors to Celanese Corporation of America, New York, N.Y., a corporation of Delaware
Filed Oct. 24, 1957, Ser. No. 692,100
19 Claims. (Cl. 260—67)

This invention relates to trioxane polymerization and more particularly to a continuous method for rapidly producing tough, high molecular weight polymers from trioxane.

It is known that trioxane polymerizes in the presence of certain catalytic materials to produce tough, high molecular weight polymers and that the polymerization process, with some catalysts is almost instantaneous. For example boron fluoride acts almost instantaneously on molten trioxane to produce a tough polymer in almost full yield, as disclosed in our application Serial No. 691,144 filed October 21, 1957, now Patent 2,989,507. Complexes of boron fluoride with organic compounds in which oxygen or sulfur is the donor atom, such as boron fluoride etherate also polymerize trioxane almost instantaneously, as disclosed in our application Serial No. 691,143, filed October 21, 1957, now Patent 2,989,506.

It is an object of this invention to provide a novel method of handling the polymerization reaction whereby the reaction is carried out continuously with full advantage being taken of the rapidity of the reaction. Other objects will appear hereinafter.

The objects of this invention are accomplished by a process which comprises dispersing molten trioxane into a form having an exposed area of at least 0.8 square feet per pound and exposing said trioxane to a polymerization catalyst which is in a gasiform state.

In a specific embodiment of the invention, as illustrated in FIGURE 1, molten trioxane is formed as a film on a solid surface. A body of molten trioxane maintained at a temperature of about 90° C. in a heated trioxane hopper 11. A casting wheel 12 rotates about a horizontal axis with its surface passing about 200 mils below the bottom of the trioxane hopper 11.

Molten trioxane is cast as a film on the casting wheel and is contacted by boron fluoride gas maintained in chamber 13. Chamber 13 encloses the casting wheel and is sealed against trioxane hopper 11 and against polymer storage hopper 14. Chamber 13 contains inlet 15 for initially introducing the boron fluoride and for replacing the small amount which is removed from the system.

Chamber 13 is maintained at a temperature of about 90° C. and the trioxane liquid film is converted substantially completely to a film of polymer. The polymer film is scraped off the casting wheel 12 by scraper blade 16 and drops into polymer storage hopper 14, from which it is removed after passing through star valve 17.

The total time of transit of a point on the casting wheel between trioxane hopper 11 and scraper blade 16 is about 1 minute.

While the invention, with respect to trioxane film, has been described with particular reference to a preferred modification it is to be understood that other modifications may be used.

For example, the film of molten trioxane may be formed on the casting wheel by instantaneously melting finely divided solid trioxane on a heated casting wheel.

In other modifications the casting wheel may be replaced by some other form of moving surface, as for example a moving belt or a rotating horizontal disc. Or, if desired, the solid surface may be replaced by a liquid surface and the molten trioxane may be floated on mercury or on a low melting alloy.

In general, the temperature of the trioxane film may vary from about 65° to about 110° C. with temperatures between about 80° and 100° being preferred. The residence time of the trioxane in the enclosed zone may vary from about 15 seconds to about 1 hour, depending on the temperature and the activity of the catalyst. The film thickness may vary from about 5 to about 200 mils, giving an exposed area between about 0.8 and about 35 square feet per pound.

In another specific embodiment of the invention, as illustrated in FIGURE 2, molten trioxane is passed into a reaction zone as a fine liquid spray and contacted therein with a gasiform polymerization catalyst.

Molten trioxane is maintained in storage vessel 51 at a temperature of about 90° C. It is passed through line 52 and spray nozzle 53 and into vertically extended polymerization vessel 54 at a rate of 0.5 pound per minute. Spray nozzle 53 is of conventional design and is capable of producing spray droplets having an average diameter of 200 microns when trioxane is passed therethrough at a pressure drop of 15 lbs. per square inch.

Boron fluoride gas, diluted with 100 volumes of nitrogen is introduced into vessel 54 through sparge line 55 at the rate of 0.2 cubic feet per minute to replace the catalyst removed from the vessel by absorption or entrainment in the product.

Solid polymer collects as a finely divided solid layer 56 at the bottom of the vessel and is removed to storage through line 57 and star valve 58.

While the invention, with respect to trioxane droplets has been described with reference to a preferred modification, it is to be understood that other modifications may be used.

For example, an inert atomizing gas may be fed to spray nozzle 53 to help produce the finely divided spray. If desired, the trioxane may be dissolved under pressure in storage vessel 51 in an aerosol propellant material which is liquefiable under pressure and which evaporates when pressure is released to leave a fine spray of molten trioxane. In this modification, additional heat should be added to the reaction zone to counter the evaporative cooling effect of the propellant. This is best accomplished by maintaining the propellant solution at a higher temperature, such as between about 100° and about 150° C.

The temperature in the reaction zone should be maintained between about 65° and about 110° C. and preferably between about 80° and about 100° C. The average residence time of the trioxane droplets is between about 1 and about 10 minutes. The average diameter of the droplets is between about 10 and about 400 microns, giving an area of between about 2500 and about 60 square feet per pound.

With respect to all modifications of this invention it is to be understood that the reactant trioxane may not be diluted with large amounts of solvents without slowing up the polymerization reaction considerably. However, the trioxane may contain small amounts of other materials to modify its melting point, viscosity or surface tension or may contain dissolved materials intended as plasticizers or stabilizers in the polymer without departing from the scope of this invention. It is to be understood that the term "molten trioxane" as used herein does not preclude compositions containing minor amounts of materials other than trioxane.

While the invention has been described with respect to boron fluoride as the catalytic material, it is to be understood that other gaseous catalysts, such as hydrogen fluoride, may be used, although hydrogen fluoride reacts more slowly and requires a longer reaction time.

The catalyst need not be gaseous per se but can be in the gasiform state when dispersed as fine liquid droplets in an inert gas. This modification permits the use of catalytic materials which are normally liquid or which may be maintained in liquid phase in a solvent. Boron fluoride complexes with organic compounds in which oxygen is the donor atom, such as boron fluoride etherate, are particularly effective catalysts of this type.

The inert gas in which the fine droplets are dispersed may also be an aerosol propellant material which is liquefiable under pressure and which forms a mist of droplets of a dissolved material when the pressure is released and the propellant is vaporized. Among the suitable inert propellants which may be used are the easily liquefiable halocarbons sold under the trademark of Freon and the easily liquefiable hydrocarbons such as propane and butane.

The polymer produced by either of the methods described above is washed free of unreacted trioxane and catalyst, dried and ground to pass through a 60 mesh sieve. It may then be molded at 180° for two minutes, particularly after stabilization with five weight percent diphenyl amine, to produce tough molded objects.

It is to be understood that the foregoing detailed description is given merely by way of illustration and that many variations may be made therein without departing from the spirit of our invention.

Having described our invention what we desire to secure by Letters Patent is:

1. A method of producing a tough, high molecular weight polymer which comprises dispersing molten trioxane into a form having an area exposed to a gaseous environment, said area being at least 0.8 square feet per pound, and contacting said trioxane with a catalyst which is effective for the homopolymerization of trioxane and which substantially fills said gaseous environment.

2. The method of claim 1 wherein said polymerization catalyst is a gas.

3. The method of claim 1 wherein said polymerization catalyst is in the form of fine liquid droplets suspended in a gas.

4. The method of claim 1 wherein said polymerization catalyst is boron fluoride.

5. A method of polymerizing trioxane which comprises forming a film of molten trioxane having an area of at least 0.8 square feet per pound on a solid surface and exposing said film to a polymerization catalyst which is in a gasiform state.

6. A method of polymerizing trioxane which comprises forming a film of molten trioxane having an area of at least 0.8 square feet per pound on a portion of a solid surface, simultaneously exposing a film of molten trioxane having an area of at least 0.8 square feet per pound on another portion of said solid surface to the action of a polymerization catalyst which is in a gasiform state to form a polymer therefrom and simultaneously removing the thus formed polymer from still another portion of said solid surface.

7. A continuous method of polymerizing trioxane which comprises applying molten trioxane to a moving solid surface to form a liquid film thereon having an area of at least 0.8 square feet per pound, subjecting said liquid film on said moving solid surface to the action of a polymerization catalyst which is in a gasiform state to form a polymer therefrom and removing the thus formed polymer from said solid surface.

8. A process for polymerizing trioxane which comprises passing a fine liquid spray of molten trioxane through a confined polymerization zone wherein it is contacted with a gasiform polymerization catalyst and withdrawing trioxane polymer from said confined zone.

9. A process for polymerizing trioxane which comprises introducing a fine liquid spray of molten trioxane into the upper portion of a vertically extended confined polymerization zone, introducing a gasiform polymerization catalyst into said polymerization zone and withdrawing trioxane polymer from the lower portion of said polymerization zone.

10. A continuous process for polymerizing trioxane which comprises continuously introducing a fine liquid spray of molten trioxane into the upper portion of a vertically extended confined polymerization zone, introducing a gasiform polymerization catalyst into said polymerization zone and continuously withdrawing trioxane polymer from the lower portion of said polymerization zone.

11. A process for polymerizing trioxane which comprises introducing a fine liquid spray of molten trioxane into the upper portion of a vertically extended confined polymerization zone, introducing a gasiform polymerization catalyst into said polymerization zone and withdrawing trioxane polymer from the lower portion of said polymerization zone.

12. A process for polymerizing trioxane which comprises passing a fine liquid spray of molten trioxane through a confined polymerization zone wherein it is contacted with a gasiform polymerization catalyst comprising boron fluoride and withdrawing trioxane polymer from said confined zone.

13. A process for polymerizing trioxane which comprises introducing a fine liquid spray of molten trioxane into the upper portion of a vertically extended confined polymerization zone, introducing a gasiform polymerization catalyst comprising boron fluoride into said polymerization zone and withdrawing trioxane polymer from the lower portion of said polymerization zone.

14. A continuous process for polymerizing trioxane which comprises continuously introducing a fine liquid spray of molten trioxane into the upper portion of a vertically extended confined polymerization zone maintained at a temperature between about 65° and about 110° C., introducing a gasiform polymerization catalyst comprising boron fluoride and an inert diluent gas into the lower portion of said polymerization zone and continuously withdrawing trioxane polymer from the lower portion of said polymerization zone.

15. The method of claim 1 wherein said trioxane is contacted with said catalyst for a period between about 15 seconds and about 1 hour.

16. The process of claim 14 wherein said trioxane is maintained in said confined zone for a period between about 1 and about 10 minutes.

17. A method of claim 1 wherein said trioxane and said catalyst are contacted at a temperature between 65° and 110° C.

18. A method of producing a tough, high molecular weight polymer which comprises dispersing molten trioxane at most about 110° C. into a form having an area exposed to a gaseous environment, said area being at least 0.8 square feet per pound, and contacting said trioxane with a catalyst which is effective for the homopolymerization of trioxane and which substantially fills said gaseous environment for about 15 seconds to 1 hour.

19. The method claimed in claim 18, wherein said catalyst is a gas.

References Cited in the file of this patent

UNITED STATES PATENTS

| | | |
|---|---|---|
| 2,270,135 | Mikeska et al. | Jan. 13, 1942 |
| 2,304,080 | Frank | Dec. 8, 1942 |
| 2,311,567 | Otto et al. | Feb. 16, 1943 |
| 2,345,013 | Soday | Mar. 28, 1944 |
| 2,375,256 | Soday | May 8, 1945 |
| 2,483,877 | Carney | Oct. 4, 1949 |
| 2,795,571 | Schneider | June 11, 1957 |
| 2,982,758 | Michaud | May 2, 1961 |